Patented Mar. 31, 1953

2,633,424

UNITED STATES PATENT OFFICE 2,633,424

METHOD OF PRODUCING CONCENTRATED MILK PRODUCTS

Herbert E. Otting, Westerville, and Cecil K. Ortman, Worthington, Ohio, assignors to M & R Dietetic Laboratories, Inc., a corporation of Ohio No Drawing. Application June 11, 1949, Serial No. 98,624

6 Claims. (Cl. 99—55)

The present invention relates to improvements in the production of milk products of reduced lactose content and the resulting products.

In the manufacture of certain types of dairy products, and particularly of concentrated liquid and paste type ice cream mixes and of confections the control of lactose content is important to avoid the presence of lactose crystals and resulting sandiness. In such products sugar, as sucrose or dextrose, is provided for sweetening and also has a preservative action. In concentrated ice cream mixes, for example, it is also necessary that the proportion of fat be sufficient so that, when reconstituted, the finished product shall meet specifications as to fat content; for example, 8 to 10%.

In the preparation of ice cream mixes it has hitherto been proposed to use as a constituent a sweetened condensed skim milk product from which a part of the lactose present has been removed by the method described in the Leighton et al. U. S. Patent No. 1,952,017 and more fully set forth in an article by Webb and Williams in Journal of Dairy Science, February 1934, pages 103–114. In carrying out the process for producing sweetened condensed skim milk of reduced lactose content in the manner therein described, in practical operation with the individual and seasonal variations in heat stability of milk that are always encountered, it is found that the effectiveness of lactose removal is reduced, and the time required for its crystallization and the difficulties encountered in separating the crystallized lactose are greatly increased as the condensation is carried to a total solids content above 60 to 65% (including sucrose), by reason of the increasing viscosity of the product and the continuing increase of its viscosity after cooling and during crystallization.

In consequence, in the preparation of such products of reduced lactose content in practical operation, it is necessary to limit the evaporation step to produce a product in the range of 60 to 65% total solids content, the lactose removal being in general somewhat less than 60%.

Even with these limitations in practical operation, the resulting lactose-reduced product offers disadvantages when used in the preparation of more concentrated liquid or paste type mixes for use in the manufacture of ice cream, confections and the like, in which the per cent of total solids is 70 to 75% or higher. They impart to such mixes a tendency to thicken in the evaporator that makes them difficult to finish to the desired concentration and also makes the resulting mix, when used for ice cream manufacture, difficult to reconstitute before freezing. To counteract these difficulties, it has been found necessary, in the preparation of such concentrated mixes, to proportionately decrease the milk proteins present and increase the butter fat, the ratio of protein to lactose in the product being less than 1:1. The proportion of minerals (derived from milk) is reduced at the same time, and the reduced content of proteins and minerals is undesirable from the nutritional standpoint.

To illustrate, we tabulate below the significant figures from the analysis of a paste type ice cream mix made using lactose-reduced condensed sweetened skim milk prepared as above set forth, the reconstituted ice cream mix prepared therefrom and a second ice cream mix meeting standards set by the Quartermaster Corps of the U. S. Army.

|  | Paste Type Mix | | Product Meeting Standard for Other Mixes |
|---|---|---|---|
|  | As Is | Reconstituted |  |
|  | Percent | Percent |  |
| Butterfat | 22.45 | 12.47 | 10.22 |
| Total Solids | 73.50 | 39.84 | 37.20 |
| Sucrose | 38.00 | 21.11 | 16.27 |
| Protein | 5.40 | 3.00 | 3.69 |
| Lactose | 5.81 | 3.15 | 5.29 |
| Minerals | 2.20 | 1.22 | 1.42 |

In accordance with the present invention it has been found that the adequate control of viscosity may be secured and the difficulties hitherto encountered in the preparation of lactose-reduced condensed sweetened milk and of more concentrated preparations therefrom may be obviated by incorporating whey therein prior to condensation or evaporation, either in the preparation of the lactose-reduced condensed milk or of the concentrated mix, and preferably the former.

Thus, in preparing the lactose-reduced condensed milk we add to the milk or skim milk to be condensed sufficient whey to provide from 20 to 80% of the mixture, and preferably from 33 to 50%. The requisite amount of sugar, preferably sucrose, is added as in the treatment of skim milk alone, and is in general about 75 to 80% on the total milk solids not fat.

The sweetened mixture of whey, skim milk and sugar is then condensed in the usual manner under vacuum at temperatures below those at which the albumins of the milk and whey coagulate. The presence of the whey controls the viscosity of the mixture and it is found possible, not only to condense to a total solids content in excess of 65%, ranging up to 70% to 73%, but also to secure a more facile and rapid crystallization of lactose from the condensed product and a more complete removal of lactose. The crystallization of the lactose is effected by cooling the condensed product to 20 to 25° C. and allowing it to stand 24 to 36 hours, and the crystallized lactose is then removed by filtration or centrifuging.

In the following illustrative examples, the milk used was of similar characteristics as to heat stability.

*Example 1*

In a control test 19,000 pounds of skim milk containing 1733 pounds M. S. N. F. were treated. 1386 pounds of sucrose were added and the sweetened milk condensed. To secure effective removal of lactose, the evaporation was halted when the product contained 64.04% total solids. Analysis showed that it contained 35.58 M. S., 28.46% sucrose, 12.45% protein and 18.86% lactose. The lactose was crystallized out and separated. 507 lbs. of lactose were secured, amounting to 58.00% of the lactose present. The lactose-reduced product analyzed 60.36% T. S.; 27.86% M. S.; 32.50% sucrose; 15.94% protein and 7.92% lactose.

*Example 2*

10,000 lbs. whey were mixed with 20,000 lbs. of the skim milk. Total solids of the mixture amounted to 2386 lbs. 1909 lbs. sucrose were added and the mixture condensed. By reason of the control exerted by the presence of the whey it was possible to condense to a total solids content of 69.65%. The product analyzed 38.39 M. S. N. F.; 31.26% sucrose; 13.82% protein and 23.03% lactose. On crystallization and separation of the lactose, 1091 lbs. (dry wt.) were secured, amounting to 75.76% of the lactose present. The lactose-reduced product analyzed 63.38% T. S.; 26.05% M. S.; 15.11% protein and 6.94% lactose.

*Example 3*

18,000 lbs. each of the whey and skim milk were mixed. Total solids of the mixture amounted to 2841 lbs. 2273 lbs. sucrose were added and the mixture condensed to a total solids content of 68.76%. The condensed product contained 38.13% M. S. N. F.; 30.63% sucrose; 10.68% protein and 24.40% lactose. The lactose crystallized and separated readily, and 1175 lbs. or a yield of 69.44% was secured. The lactose reduced product analyzed 63.59% T. S.; 26.06% M. S.; 37.53% sucrose; 12.73% protein and 9.33% lactose.

As appears from the preceding examples, by combining the whey and skim milk as hereinbefore set forth, and the resulting improved control of viscosity, it is possible to condense to a higher total solids content and still obtain a better and more effective removal of lactose and a higher yield of separated lactose. The whey used contains from 6.00 to 6.50% total solids and the skim milk from 9.00 to 9.25% total solids. Using 20 to 80% whey in preparing the lactose-reduced product, the proportion of the milk solids in the product derived from the whey is from about 14 to about 73%. In the preferred range of 33 to 50% whey in preparing the product, the proportion of the milk solids in the product derived from the whey is from about 25% to about 40%. The total solids content of the product after lactose removal is from 62 to 68%.

The lactose separated from the condensed whey-skim milk mixture as above described may be directly employed, for example, in the manufacture of infants' foods; or it may be further refined.

The lactose-reduced product obtained as above described may be employed in the manufacture of concentrated nonsolid ice cream mixes of the liquid or paste type or of confections in which the sandiness due to crystallized lactose is undesirable. It is particularly desirable for use in such ice cream mixes for a number of reasons. It prevents the development of excessively high viscosities in the further concentration required in preparing such mixes. It also provides increased proportions of proteins which are desirable from the nutritional standpoint, particularly lactalbumin and lactoglobulins, and permits reduction in the butterfat content and increase in the protein content of the concentrated mix. The incorporation of the whey solids in the ice cream mix not only reduces its viscosity and facilitates its reconstitution, but also improves its overrun properties during freezing. The proportions of caseinate ordinarily used to secure the desired overrun and whipping properties may be reduced by as much as 30%.

In preparing a concentrated fluid or paste type ice cream mix, the legal standards and the specifications set by the purchaser for the fat, protein and other constituents in the concentrate and in the reconstituted ice cream must be met and the ingredients varied accordingly. Butterfat or cream, with or without whole milk (the latter preferably as sweetened condensed milk) may be added to secure the desired fat content, which may be from 18 to 23% of the total. When whole milk is used, a substantial part of the milk solids not fat of the final product, say 25 to 45%, may be supplied by it. Instead of using cream or whole milk, butterfat and skim milk may be used in the proper proportions, since skim milk provides milk solids not fat in essentially the same proportions as does whole milk. The remaining milk solids, not supplied by the cream, or by the cream and milk, or by the skim milk, may be supplied partly or entirely by the lactose-reduced whey-skim milk mixture prepared as above described, or a part of them, say up to about 20% of the total M. S. N. F. may be supplied by other proteins derived from milk, for example, sodium caseinate.

The presence of the additional whey solids in proportions from 10 to 25% of the total of milk solids not fat in the mixture beneficially affects the viscosity of mixture during concentration to its final state, in which the total solids (including sugar) may range from 65 to 75%. For example, recent specifications for such products require 70 to 72% total solids, and the manufacturer aims to exceed these requirements. The presence of the additional whey solids as above referred to permits such total solids contents to be attained without excessive thickening in the evaporator, even with the use of milk or skim milk which otherwise causes such excessive thickening even before the desired total solids content can be attained.

Furthermore, the presence of the additional whey solids in the proportions referred to controls the viscosity of the product and prevents its excessive thickening on standing, thus facilitating reconstitution.

The amount of sugar required in such products will in general give a proportion of sugar to total solids in the order of 49 to 53%. To avoid excessive sweetness of the reconstituted product, the sugar present should not provide more than about 22% sucrose therein.

The production of a concentrated ice cream mix of this character may be illustrated by the following example, in which the product is to contain approximately 18.5% butterfat, or slightly thereabove, to be reconstituted to form an ice cream containing about 10% butterfat. In view of the normal variations in solids content in the ingredients used, the amounts of the constituents supplied are indicated by the proportions of milk solids not fat supplied by each constituent.

|  | Percent M. S. N. F. |
|---|---|
| Cream, to supply | 10.0 to 10.5 |
| Sweetened condensed whole milk, to supply | 34 to 34.5 |
| Sweetened, lactose-reduced condensed whey-skim milk as above set forth, to supply | 38 to 40 |
| Sodium caseinate, to supply | 12 to 15 |

Instead of using cream and whole milk, butterfat and skim milk, whole or condensed, may be used to provide the equivalent amounts of butterfat and normal milk solids indicated above as being supplied by cream and whole milk.

The resulting mixture is then concentrated under vacuum to the desired total solids content, of 70 to 75%, and which, under present standards, should be at least 72% and preferably 73 to 74%. Analysis of the resulting product and of the reconstituted ice cream give the following results in a typical example:

|  | Concentrate | Reconstituted |
|---|---|---|
|  | Percent | Percent |
| Butterfat | 18.60 | 10.17 |
| Total Solids | 73.11 | 39.90 |
| Sucrose | 38.47 | 21.00 |
| Protein | 8.01 | 4.37 |
| Lactose | 4.08 | 2.23 |
| Minerals | 4.10 | 2.23 |

On comparison with the composition heretofore given for the concentrate made without added whey solids in the lactose-reduced condensed milk it will be noted that the concentrate made in accordance with the present invention is substantially higher in protein and minerals and lower in lactose, having a protein to lactose ratio well exceeding 1. Although somewhat lower in butterfat content, the reconstituted ice cream from the concentrate prepared in accordance with the present invention meets all requirements and is better in flavor and texture, grading higher than the ice cream from the concentrate not containing added whey.

In preparing the ice cream concentrate in accordance with the present invention, the caseinate may be replaced partly or wholly by the lactose-reduced condensed whey-skim milk produced as hereinbefore described. Furthermore, instead of using such lactose-reduced condensed whey-skim milk, a part of the milk solids may be supplied from lactose-reduced condensed skim milk and whey or condensed whey, preferably lactose-reduced, may be added before final concentration to supply 10 to 25% of the milk solids not fat in the final concentrate.

The whey used in carrying out the present invention may be the whey from any cheese-making process, for example, cottage cheese whey, cheddar cheese whey or Swiss cheese whey or mixtures thereof may be used. Whey from caseinate manufacture may also be used, but because of its salt content, resulting from the partial neutralization of the hydrochloric acid used to precipitate the casein, it is preferred that it be used in admixture with one or another of the cheese wheys.

We claim:

1. The method of producing a lactose-reduced condensed milk product which comprises concentrating under vacuum a mixture of skim milk and whey containing 20 to 80% whey in the presence of added sugar amounting to 75 to 80% of the total milk solids not fat, continuing the concentration to secure a product of 65 to 73% total solids, cooling, permitting the lactose to crystallize therefrom and separating the crystallized lactose.

2. The method of producing a lactose-reduced condensed milk product which comprises concentrating under vacuum a mixture of skim milk and whey containing 33 to 50% whey in the presence of added sugar amounting to 75 to 80% of the total milk solids not fat, continuing the concentration to secure a product of 65 to 73% total solids, cooling, permitting the lactose to crystallize therefrom and separating the crystallized lactose.

3. The method of producing a nonsolid ice-cream concentrate which comprises providing a mixture containing butterfat, milk solids not fat and sugar, and incorporating in the mixture sufficient whey to provide 10 to 25% of the milk solids not fat in the concentrate, and concentrating the mixture to a total solids content of 70 to 75%, the sugar present being in the order of 49 to 53% on the total solids.

4. The method of producing a nonsolid ice-cream concentrate which comprises admixing milk products of the class consisting of butterfat and cream with milk products of the class consisting of whole milk and skim milk, thereby providing the butterfat content and 25 to 45% of the milk solids not fat of the concentrate, incorporating in the resulting mixture a lactose-reduced sweetened condensed mixture of whey and skimmed milk containing 25 to 40% whey solids and concentrating the mixture to a total solids content of 70 to 75%, the sugar present being in the order of 49 to 53% on the total solids.

5. A lactose-reduced, condensed, sugar-sweetened ice cream concentrate having a total solids content of 70 to 75% and consisting essentially of milk solids derived solely from both skim milk and whey, the proportion of the whey solids being from about 14% to about 73%, the lactose content of the condensed sweetened ice cream concentrate being less than that originally present in said skim milk and whey starting materials and the ratio of protein to lactose in the ice cream concentrate being over 1, and the proportion of sugar sweetening agent being from 75 to 80% of the total milk solids in the ice cream concentrate.

6. A lactose-reduced, condensed, sugar-sweetened ice cream concentrate having a total solids content of 70 to 75% and consisting essentially of milk solids derived solely from both skim milk and whey, the proportion of the whey solids being from about 25% to about 40%, the lactose content of the condensed sweetened ice cream concentrate being less than that originally present in said skim milk and whey starting materials and the ratio of protein to lactose in the ice cream concentrate being over 1, and the proportion of sugar sweetening agent being from 75 to 80% of the total milk solids in the ice cream concentrate.

HERBERT E. OTTING.
CECIL K. ORTMAN.

REFERENCES CITED

The following references are of record in the file of this patent:

UNITED STATES PATENTS

| Number | Name | Date |
|---|---|---|
| 442,593 | Rehnstrom | Dec. 9, 1890 |
| 2,279,205 | Parsons et al. | Apr. 7, 1942 |
| 2,433,850 | Leviton | Jan. 6, 1948 |
| 2,473,493 | Otting et al. | June 14, 1949 |